United States Patent [19]
Ganski et al.

[11] Patent Number: 6,148,691
[45] Date of Patent: Nov. 21, 2000

[54] SYSTEM FOR SHIFTING A MULTIPLE SPEED AXLE FOR AN AUTOMATED MECHANICAL TRANSMISSION

[75] Inventors: Gerald Edward Ganski, Lawton; Stephen Alton Edelen, Battle Creek, both of Mich.

[73] Assignee: Eaton Corporation, Cleveland, Ohio

[21] Appl. No.: 09/393,725

[22] Filed: Sep. 10, 1999

Related U.S. Application Data

[60] Provisional application No. 60/145,729, Jul. 27, 1999.
[51] Int. Cl.[7] .................................................. F16H 37/08
[52] U.S. Cl. .............................. 74/745; 74/335; 477/908; 477/35
[58] Field of Search ................................. 477/908, 35, 36; 74/335, 745

[56] References Cited

U.S. PATENT DOCUMENTS 5,980,413  11/1999  Anderson et al. ........................ 74/335

*Primary Examiner*—Dirk Wright
*Attorney, Agent, or Firm*—Rader, Fishman & Grauer PLLC

[57] ABSTRACT

A system for controlling the operation of a multiple speed axle connected to an automated transmission system is disclosed. The system includes an actuation device that cooperates with a processing unit to prevent the transmission from shifting gears while the axle shift is being performed. In one embodiment, once transmission shifting is prevented, the axle shift operation is performed manually by the vehicle operator, such that the vehicle operator manipulates the vehicle throttle to interrupt torque and synchronize the axle for engagement. The automated transmission then notifies the operator that the transmission is in a hold mode until the operator determines that the axle shift has been completed. The operator then manually returns the transmission to the drive mode to resume normal automatic transmission shifting. In a second embodiment, the axle shift operation is automatically performed by the processing unit.

22 Claims, 4 Drawing Sheets

SYSTEM FOR SHIFTING A MULTIPLE SPEED AXLE FOR AN AUTOMATED MECHANICAL TRANSMISSION

This application claims the benefit of U.S. Provisional Application No.: Application No.: 60/145,729 filing date Jul. 27, 1999.

BACKGROUND OF THE INVENTION

1. Field of the Invention

The present invention relates to a system for controlling a multiple speed axle in an automated mechanical transmission system. More particularly, the invention relates to a system for controlling, either manually or automatically, a multiple speed axle that is attached to a medium duty automated transmission, to insure proper and safe shifting between axle speeds.

2. Description of the Prior Art

It is well known in the prior art to provide both automatic and manual transmission systems with multiple speed axles for high and low range speed modes. For example, when a vehicle operator requires more torque to improve climbing power of the vehicle for off-road driving, it is desirable to utilize a low speed mode. Conversely, when the vehicle is in operation on a traditional well-maintained roads, a high speed mode is used.

In one known multiple speed axle application for a manual transmission, the vehicle operator is responsible for properly and simultaneously operating the vehicle, the axle, the transmission and the engine. Thus, the operator must simultaneously ensure that the vehicle speed stays within a proper range of speeds to facilitate safe shifting, maintain the present transmission gear ratio and manipulate the engine throttle to effect a synchronous condition in the axle, in order to properly complete an axle range shift. Once the operator determines that the axle range shift has been completed, the driver may proceed with normal driving and transmission shifting procedures. To avoid much of this complexity and also to protect the axle, transmission, engine and the vehicle; many drivers only perform these axle range shifts when the vehicle is stopped.

The prior art also discloses multiple speed axles in automatic and semi-automatic shift implementation for mechanical transmissions. In these types of systems, the vehicle operator is required to know when the engine will prompt a transmission shift so as to avoid performing an axle shift during the transmission shift operation. Further, it is the operator's responsibility for determining the proper speed in which to accomplish a safe axle shift and to synchronize the vehicle drive shafts within the axle. As with manual transmission systems, once the operator determines that it is safe to proceed with an axle shift, the operator manually causes a torque interruption and synchronizes the multiple speed axle for engagement. Ultimately, safe shifting of the multiple speed axle is wholly dependent upon the operator knowing when not to cause a transmission shift.

Known prior art axle shift control systems are undesirable as they require that the vehicle operator have a relatively high level of skill and experience to properly operate the vehicle and to know when an axle shift can be safely accomplished. For example, known axle shift systems places the burden on the operator to inhibit transmission shifts, break torque and safely engage the split axle to permit the engine to achieve the desired gear ratio. Accordingly, there is no current system available that indicates to the driver when an axle shift may be safely accomplished or that automatically controls an axle shift operation.

SUMMARY OF THE INVENTION

The present invention is directed to a system for controlling a multiple speed axle connected to an automated transmission system in a vehicle. The transmission includes an input shaft for connection to an engine and an output shaft for delivering rotational power to the multiple speed axle. The transmission is automated, i.e., an automatic transmission or semi-automatic transmission, whereby the transmission gears are shifted automatically by a system processing unit in accordance with programmed logic.

According to the present invention, the multiple speed axle is selectively shiftable between a low speed range and a high speed range. To initiate an axle shift between the low and high speed ranges, a manually operated actuation device is provided to prevent shifting of the transmission gears. The actuation device is preferably a mode key button, which when pressed by the operator, sends a signal to the processing unit. The processing unit receives the inputs from the actuation device, indicating that an axle shift has been requested, and processes the request according to predetermined logic rules to place the transmission in a hold mode. When the transmission is in the hold mode, the transmission is prevented from performing automatic transmission gear shifts such that the axle shift may be accomplished without damage to the transmission. Thus, the vehicle driver is relieved of the responsibility of knowing when an axle shift may be safely completed such that the transmission will not become damaged.

In one embodiment, once the transmission is placed in the hold mode, the vehicle operator manually carries out the axle shift operation. In the manual system, the vehicle operator manipulates an engine throttle to interrupt axle torque lock and controls the engine to synchronize the axle-input speed to achieve axle engagement and complete the axle shift operation. After the vehicle operator secures the axle engagement, the operator returns the transmission to drive mode, whereby shifting of the transmission gears is permitted by the transmission.

In an alternative embodiment, the axle shift operation is fully automated such that the processing unit carries out the axle shift operation without the vehicle operator's assistance. For example, once the vehicle operator initiates an axle request by operating the actuation device, the processing unit receives input data from speed sensors mounted on drive wheels that are connected to the multiple speed axle and from the output shaft of the transmission. The processing unit evaluates the input data to determine if the requested axle shift can be safely and properly completed under the current vehicle conditions using predetermined logic rules. If the processing unit determines that the axle shift can be completed, the processing unit automatically places the transmission in a hold mode to prevent transmission gear shifts during the axle shift operation. However, if the processing unit determines that the axle shift cannot be properly completed based on the input data, the processing unit cancels the axle shift request such that the transmission is still in a drive mode where the transmission is permitted to automatically shift gears, and preferably alerts the vehicle operator that the axle shift could not be completed.

Once the transmission is placed in the hold mode, the processing unit then automatically carries out the remainder of the axle shift operation. Specifically, the processing unit sends a signal to the output shaft of the transmission to interrupt torque to the multiple speed axle. Next, the system automatically synchronizes the axle-input speed to achieve axle engagement. The processing unit monitors the axle-input speed to detect and confirm that axle engagement has occurred. If axle engagement is confirmed, the axle shift is completed and the processing unit automatically returns the transmission to the drive mode. If, however, the processing unit detects that axle engagement has not occurred, the processing unit returns to synchronizing the axle-input speed.

It is preferred that both the manual and automatic axle shift systems provide mode indicators that inform the vehicle operator when the transmission is in the hold mode and it is safe to proceed with an axle shift (manual) or that an axle shift is being performed (automatic). It is also preferred that a display be provided that indicates what torque range the multiple speed axle is operating at, i.e., low torque or high torque.

Other features and advantages of the invention will be apparent from the ensuing description in conjunction with the accompanying drawings.

DETAILED DESCRIPTION OF THE PREFERRED EMBODIMENT

In accordance with the present invention, a system 100, 200 for controlling an axle shift operation for an automated mechanical transmission system 20 is disclosed. The term "transmission" as used herein includes both "simple" and "compound" transmissions. A "simple transmission" refers to a change-speed transmission, wherein the vehicle operator may select one of a plurality of single gear reductions. A "compound transmission" designates a change-speed transmission having a main transmission portion and an auxiliary transmission portion connected in series whereby the selected gear reduction in the main transmission portion may be compounded by further selected gear reduction in the auxiliary transmission portion. A "compound transmission" includes a "splitter-type compound transmission," which designates a compound transmission wherein the auxiliary transmission is used to provide various selectable steps for subdivisions of the gear ratio selected in the main transmission portion. In a splitter-type compound transmission, the main transmission section is typically provided with relatively wide steps that are split or subdivided by the auxiliary section.

A "compound transmission" also includes a "range-type compound transmission," which refers to a compound transmission having an auxiliary section with a relatively large step, as compared to the ratio steps of the main transmission section.

Figure 1:
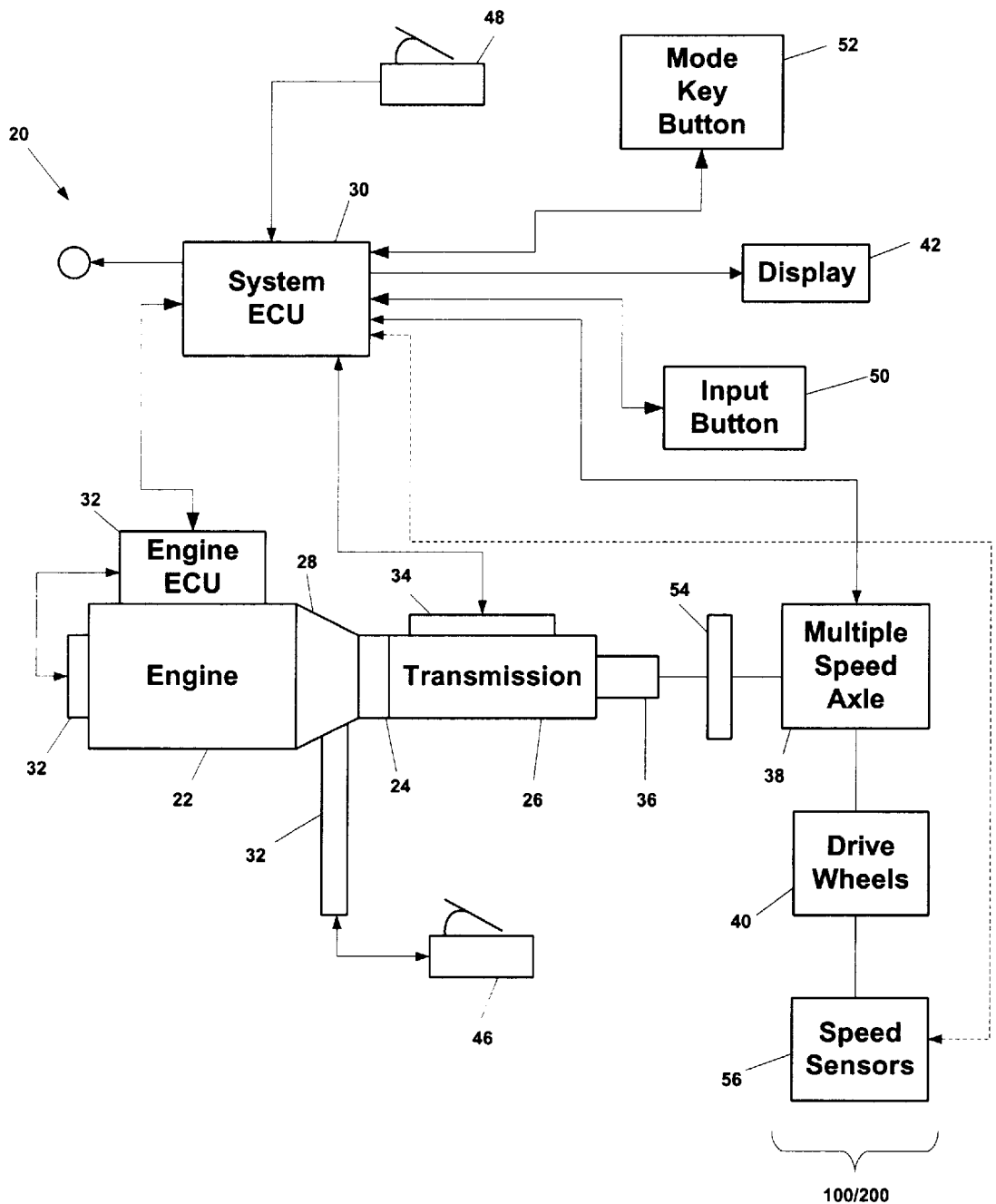
FIG. 1 is a schematic illustration of an automated transmission connected to a multiple speed axle in accordance with the present invention.

Referring to FIG. 1, transmission system 20 includes a vehicle engine 22 that is interconnected to an input shaft 24 of a transmission 26 through a master clutch 28 and controlled by a system electronic control unit ("ECU") 30. The system ECU 30 is electronically connected to an engine ECU 32, which controls the engine 22 through inputs and outputs responsive to driver action and performance.

Further, system ECU 30 is connected to transmission 26 through a transmission operator 34, which automatically controls transmission 26. Transmission operator 34 receives inputs and outputs for controlling transmission 26 from both driver action and the transmission 26. Transmission 26 further includes an output shaft 36 that is driven at a speed that is reduced relative to the speed of the input shaft 24 by a selected gear ratio. Output shaft 36 is connected to a multiple speed axle 38, which in turn is connected to drive wheels 40.

In accordance with one aspect of the invention, system ECU 28 is interconnected to a display 42. Display 42 apprises a vehicle operator of the transmission system 20 performance and the status of axle shift operation system 100, 200. Each will be discussed below in greater detail.

The transmission operator 34 controls the transmission 26 in response to signals from system ECU 30. The transmission 26 is an automated transmission, i.e., automatic or semiautomatic, whereby the system ECU 30 controls the shifting of gears of the transmission 26 in response to signals sent to the transmission operator 34 based on inputs received from transmission 26, engine 22 and the vehicle operator. During vehicle operation, the vehicle operator does not manually shift gears of transmission 26. Instead, shifting is controlled by programmed logic in the system ECU 30. Control logic circuits, sensors and actuators for the transmission system 20, as illustrated schematically in FIG. 1, may be as disclosed in U.S. Pat. Nos. 4,361,060; 4,648,290; 4,930,081; 4,930,081; 4,930,081; 4,930,078; and 5,816,100, incorporated herein by reference. Specifically, system ECU 30 receives inputs, processes them in accordance with predetermined logic rules, and provides command output signals to pneumatic and/or electric actuators 44 for control of an input shaft brake 46, engine ECU 30, an exhaust brake 48, and/or ratio shifting via transmission operator 22. The processing unit of the system ECU 30 may be of the type illustrated in U.S. Pat. No. 4,595,986 and may incorporate fault detection and tolerance logic of the type illustrated in U.S. Pat. Nos. 4,849,899; 4,899,279 and 4,945,484. The transmission operator 22 may also be of the "X-Y" type, as illustrated in U.S. Pat. Nos. 4,873,881 and 4,899,607, the disclosures of which are incorporated herein by reference.

In accordance with the present invention, axle shift operation system 100, 200 is connected to the transmission system 20 to permit the vehicle operator to selectively and safely accomplish an axle shift to shift between high and low range speed modes for the drive shaft in the axle. In one preferred embodiment, the axle shift operation system 100 is a manual system.

Figure 2:
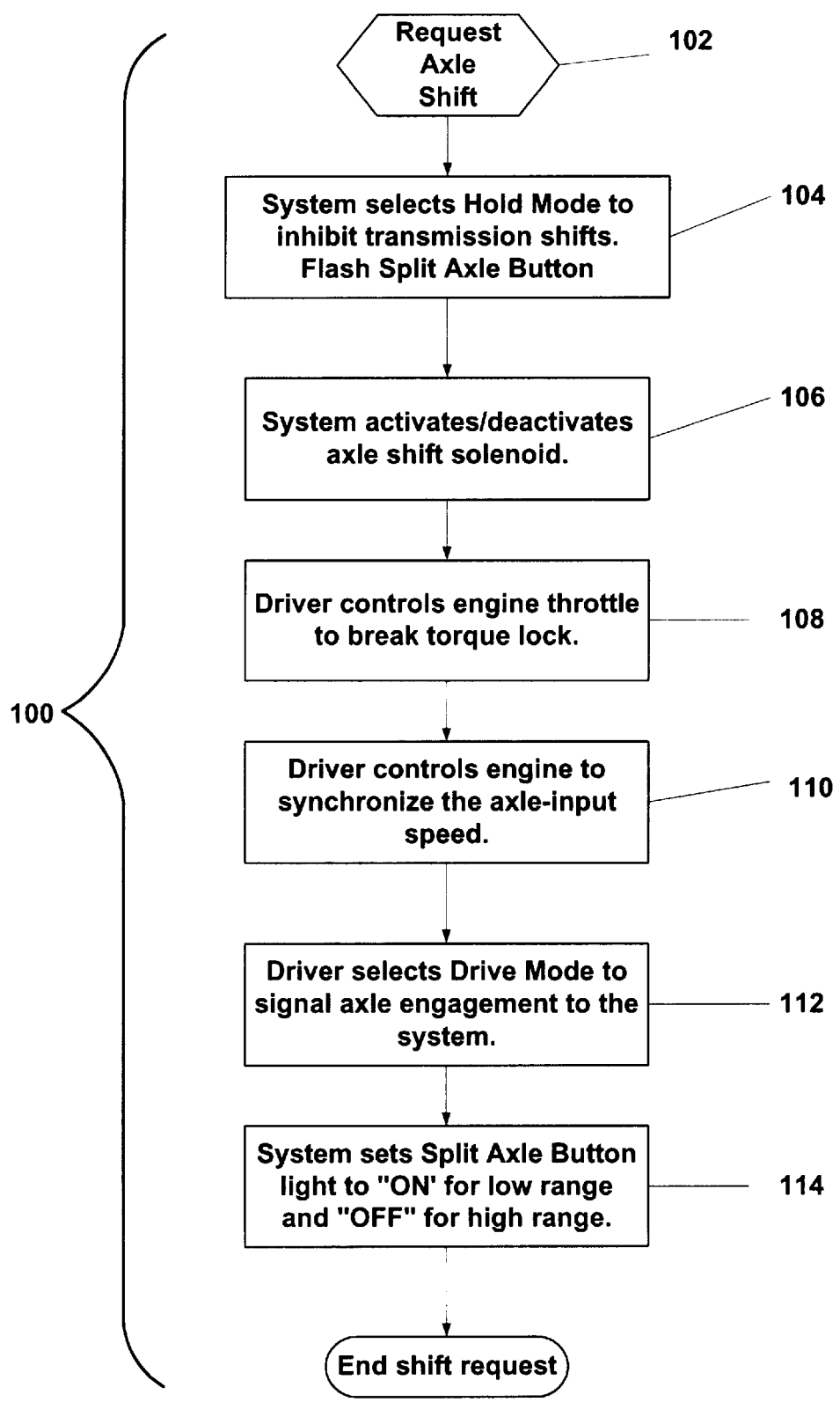
FIG. 2 is a schematic illustration in flowchart format of a manually-operated multiple axle shift system in accordance with the present invention.

The use of the manual axle shift operation system 100 is set forth in flowchart form in FIG. 2. To begin, the vehicle is first positioned in a drive mode, which is preferably signaled to the system ECU by an input actuation button 50 positioned on display 42 or other suitable actuation device. In manual system 100, when the vehicle operator desires to shift from a high range/low range speed mode, for example, the vehicle operator inputs an axle shift request 102 which sends a signal the system ECU 30. The request 102 may be made while the vehicle is at rest or is in forward motion. The axle shift request 102 is preferably accomplished by means of a mode key button 52 or other actuation device that is connected to the system ECU 30, where the mode key button 52 is positioned on a control console adjacent to or integrated with display 42 within the vehicle.

Once the mode key button 52 is actuated, a signal is sent to the system ECU 30 and the transmission is placed in a hold mode 104. In accordance with the invention, during the hold mode 104, the transmission 26 is prevented from performing automatic transmission gear shifts. Thus, damage to the transmission 26 is prevented and the vehicle operator is relieved of the responsibility of preventing shifting of the transmission. The ECU 30 then actuates an axle shift solenoid 54 and a mode indicator to inform the vehicle operator that it is safe to proceed with an axle shift 106. In one embodiment, the mode indicator includes display 42 being illuminated with a flashing light to indicate that an axle shift has been requested and transmission 26 is in the hold mode. Other suitable indicators, such as audible or digital text indicators are contemplated as well.

Upon actuation of the hold mode 104, the vehicle operator then manipulates an engine throttle to interrupt axle torque lock 108. Next, the vehicle operator controls the engine to synchronize the axle-input speed to achieve axle engagement 110. Once the axle shift is successfully completed, i.e. the axle is engaged in high or low speed mode, the operator then actuates the input actuation button 50 to signal to the system ECU 30 that successful axle engagement has been achieved 112 and to return the vehicle into drive mode. By placing the vehicle back into the drive mode, automatic shifting of the transmission 26 is permitted. Finally, it is preferred that the system ECU 30 informs the vehicle operator of the operating speed mode. Accordingly, system ECU 30 actuates the mode indicator on display 42 to indicate to the vehicle operator that the multiple speed axle is set in high or low speed mode 114. For example, an "ON" light may be turned on to indicate that low torque speed has been activated, while simultaneously an "OFF" light used to indicate that the high torque speed is not in use. Other suitable indicators may be employed, as well.

Figure 3:
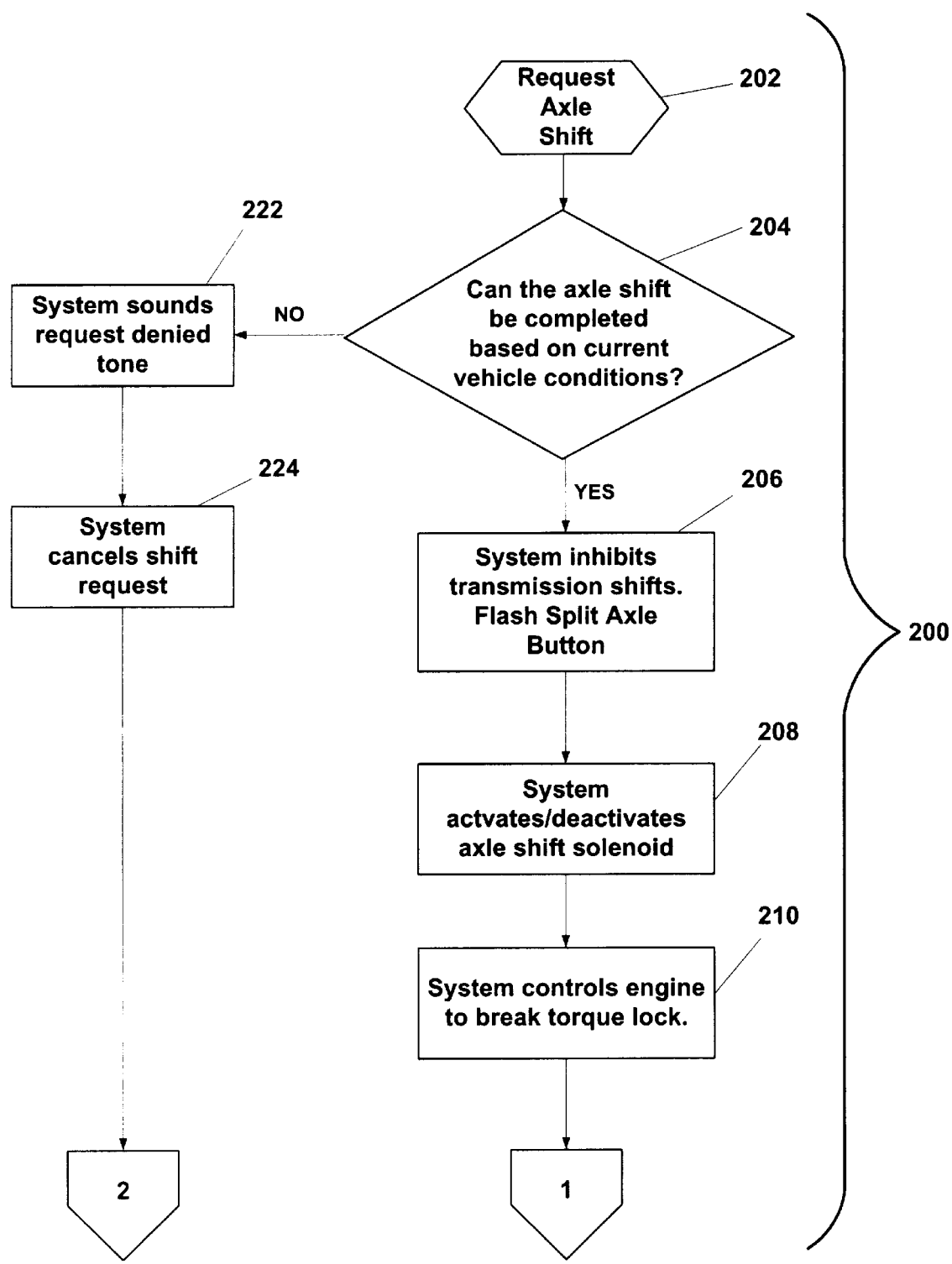
FIGS. 3 and 4 are schematic illustrations in flowchart format of an automatically-operated multiple axle shift system in accordance with the present invention.
Figure 4:
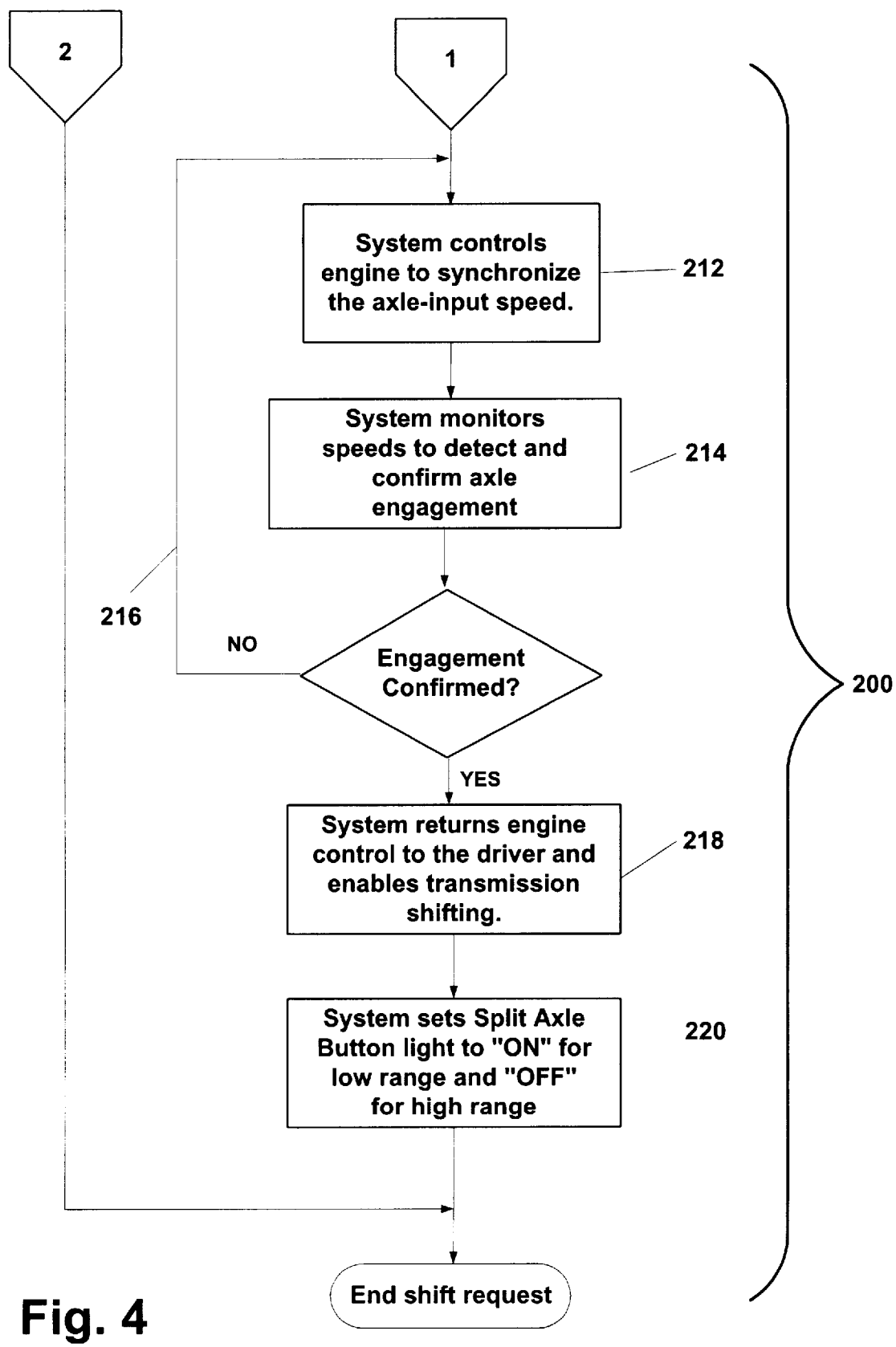

Referring to FIGS. 3 and 4, a second embodiment of axle shift operation system 200 is disclosed. System 200 is an automatic system and further includes speed sensors 56 installed on the drive wheels 40 connected to the multiple speed axle 38. Speed sensors 56 provide speed feedback information to the system ECU 30 to insure safe and proper shaft synchronization in the multiple speed axle 38 and to inhibit transmission shifts during the axle shift operation.

To operate the automatic system 200, the vehicle operator begins by inputting an axle shift request 202 which sends a signal the system ECU 30. The request is made when system ECU 30 is set in drive mode and may be made while the vehicle is at rest or is in forward motion. The axle shift request 202 is preferably accomplished by means of a mode key button 52 or other actuation device that is connected to the system ECU 30, where the mode key button 52 is positioned on a control console adjacent to or integrated with display 42 within the vehicle.

Next, the system ECU 30 receives inputs from the speed sensors 56 and output shaft 36. The inputs are evaluated 204 by system ECU 30 to determine if the requested axle shift can be safely completed using predetermined logic rules. If the transmission output shaft 36 and drive wheel speed are within predetermined ranges, the system ECU 30 automatically selects the hold mode 206. Referring to the right column on the flowchart in FIGS. 3 and 4, in accordance with the invention, during the hold mode 206, the transmission 26 is prevented from performing automatic transmission gear shifts, thereby preventing damage to the transmission. Further, placing the transmission 26 in the hold mode 206 also relieves the vehicle operator of the responsibility of preventing an axle shift when the transmission gears are shifting. Once in the hold mode 206, the system ECU 30 then automatically actuates the shift solenoid 54 and a mode indicator to inform the vehicle operator that the system ECU 30 is proceeding with an axle shift 208. In one embodiment, display 42 is illuminated with a flashing light to indicate that an axle shift has been requested and transmission 26 has been placed in the hold mode. Other suitable indicators, such as audible or digital text indicators are contemplated as well.

In contrast to the manual system 100, the automatic system 200 next automatically proceeds with performing the axle shift operation, thereby relieving the vehicle operator from manually performing the axle shift. Accordingly, the system ECU 30 sends a signal to the engine 22 to break torque lock 2 10. Next, the system ECU 30 automatically synchronizes the axle-input speed 212 to achieve axle engagement. System ECU 30 monitors the axle-input speed to detect and confirm that axle engagement has occurred 214. If system ECU 30 detects that the axle-input speed is out of an accepted predetermined range such that axle engagement does not occur, system ECU 30 returns to synchronizing the axle-input speed 216. If axle engagement is confirmed by the system ECU 30, the axle shift is completed and the system ECU 30 automatically puts the vehicle in drive mode, thereby permitting automatic transmission shifting 218. Finally, it is preferred that the system ECU 30 informs the vehicle operator of the operating speed mode. Accordingly, system ECU 30 actuates the mode indicator on display 42 to indicate to the vehicle operator that the multiple speed axle is set in high or low speed mode 220. For example, an "ON" light may be turned on to indicate that low torque mode has been activated, while simultaneously an "OFF" light used to indicate that the high speed mode is not in use. Other suitable indicators may be employed, as well.

Automatic system 200 further includes an additional safety feature that manual system 100 and the prior art do not provide. Referring to the left column in the flowchart of FIGS. 3 and 4, if the transmission output shaft 26 and drive wheel speed are outside the accepted predetermined range whereby the axle shift may not be completed safely, the system ECU 30 automatically actuates an indicator 222 that informs the vehicle operator that an axle shift may be completed. It is preferred that the indicator is an audible indicator, however, any suitable indicator may be employed. cancels the shift request. Next, the system ECU 30 cancels the shift request 224 and automatically returns the vehicle to drive mode, such that automatic transmission shifting is permitted.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for performing a shift operation of a multiple speed axle, comprising:

a multiple-speed, automated change-gear mechanical transmission having an input shaft for connection to an engine and an output shaft for delivering rotation power to a multiple speed axle;

wherein said multiple speed axle is selectively shiftable between a first speed range and a second speed range;

a manually operated actuation device to initiate an axle shift of said multiple speed axle to selectively control said mechanical transmission by preventing said transmission from shifting gears during said axle shift between said first speed range and said second speed range; and a processing unit for receiving inputs indicative of operation of said actuation device and for processing said inputs according to predetermined logic rules for issuing command output signals to a non-manually controlled operator, wherein said controlled operator places said transmission in a hold mode when said axle shift is in progress, thereby preventing said transmission from shifting gears while said axle shift is being performed.

2. The system as recited in claim 1, wherein said axle shift operation further includes said processing unit actuating an axle shift solenoid in response to operation of said actuation device, thereby permitting manual shifting of said multiple speed axle.

3. The system as recited in claim 1, wherein said actuation device is a mode key button, whereby when said mode key button is actuated, a signal is sent to said processing unit to place said transmission in said hold mode to prevent transmission gear shifts during said axle shift.

4. The system as recited in claim 1, further including at least one mode indicator, whereby said mode indicator informs the vehicle operator when said transmission is in said hold mode, such that said axle shift may be properly completed.

5. The system as recited in claim 4, wherein said at least one mode indicator further informs the vehicle operator when said transmission is in a drive mode whereby transmission gear shifts are automatically being performed and said axle shift is undesirable.

6. The system as recited in claim 1, wherein said axle shift operation includes the vehicle operator manually manipulating an engine throttle to interrupt axle torque lock and synchronizing input speed to said multiple speed axle to achieve axle engagement.

7. The system as recited in claim 6, wherein said actuation device is actuated by the vehicle operator after said axle engagement is achieved by the vehicle operator to signal said processing unit to place said transmission in a drive mode, whereby said transmission is permitted to shift said transmission gears.

8. A system for performing a shift operation of a multiple speed axle, comprising:

a multiple-speed, automated change-gear mechanical transmission having an input shaft for connection to an engine and an output shaft for delivering rotation power to multiple speed axle;

wherein said multiple speed axle is selectively shiftable between a first speed range and a second speed range;

a manually operated actuation device to initiate an axle shift of said multiple speed axle to selectively control said mechanical transmission by preventing said transmission from shifting gears during said axle shift between said first speed range and said second speed range;

speed sensors mounted on drive wheels connected to said multiple speed axle and said output shaft of said transmission; and a processing unit for receiving inputs indicative of said operation of said actuation device and said speed sensors for processing said inputs according to predetermined logic rules for issuing command output signals to a non-manually controlled operator, wherein said controlled operator places said transmission in a hold mode if said inputs from said speed sensors are within a predetermined range to prevent said transmission from shifting gears while said axle shift is being performed.

9. The system as recited in claim 1, further including an operating speed indicator, whereby said operating speed indicator informs the vehicle operator of the current speed range for said multiple speed axle.

10. The system as recited in claim 1, wherein a display is mounted in the vehicle having at least one mode indicator mounted thereon, said display informing the vehicle operator when it is safe to proceed with said shift operation.

11. The system as recited in claim 1, wherein said system further includes speed sensors mounted on drive wheels connected to said multiple speed axle and said output shaft of said transmission, said speed sensors interconnected to said processing unit to provide speed input data to said processing unit regarding speed of said multiple speed axle and said output shaft of said transmission.

12. The system as recited in claim 11, wherein said processing unit evaluates said speed input data from said multiple speed axle and said output shaft of said transmission to determine if said speed input data is within a predetermined range, whereby said processing unit signals said transmission to automatically place said transmission into said hold mode if said input speed data is within said predetermined range.

13. The system as recited in claim 12, wherein said processing unit automatically signals said output shaft of said transmission, after said transmission is placed in said hold mode, to interrupt torque to said multiple speed axle and synchronize an axle-input speed to achieve axle engagement, such that said axle shift operation is a fully automated system.

14. The system as recited in claim 12, wherein said processing unit cancels said initiation of said axle shift when said speed input data is outside of said predetermined range, whereby said transmission remains in a drive mode such that automatic shifting of transmission gears is permitted.

15. The system as recited in claim 14, further including an indicator that informs the vehicle operator that said initiation of said axle shift has been canceled, said indicator being actuated automatically by said processing unit.

16. A system for performing a shift operation of a multiple speed axle, comprising:

a multiple-speed, automated change-gear mechanical transmission having an input shaft for connection to an engine and an output shaft for delivering rotation power to a multiple speed axle;

wherein said multiple speed axle selectively shiftable between a first speed range and a second speed range;

a manually operated actuation device to initiate an axle shift of said multiple speed axle to selectively control said mechanical transmission by preventing said transmission from shifting gears during said axle shift between said first torque range and said second torque range; and a processing unit for receiving inputs indicative of operation of said actuation device and for processing said inputs according to predetermined logic rules for issuing command output signals to a non-manually controlled operator and an axle shift solenoid, wherein said controlled operator places said transmission in a hold mode in response to said outputs from said processing unit when said axle shift is in progress, thereby preventing said transmission from shifting gears while said axle shift is being performed and said axle shift solenoid permits manual shifting of said multiple speed axle;

wherein said manual shifting further includes the vehicle operator manually manipulating an engine throttle to interrupt axle torque lock and synchronizing input speed to said multiple speed axle to achieve axle engagement and complete said axle shift.

17. The system as recited in claim 16, wherein said actuation device is actuated by the vehicle operator after said axle engagement is achieved to signal said processing unit to return said transmission to a drive mode whereby said transmission is permitted to automatically shift transmission gears.

18. The system as recited in claim 16, further including at least one mode indicator, whereby said mode indicator informs the vehicle operator when said transmission is in said hold mode, such that said axle shift may be properly completed and when said transmission is in said drive mode whereby transmission gear shifts are automatically being performed and said axle shift is undesirable.

19. The system as recited in claim 16, further including an operating torque indicator, whereby said operating speed indicator informs the vehicle operator of the current speed range for said multiple speed axle.

20. A system for performing a shift operation of a multiple speed axle, comprising:

a multiple-speed, automated change-gear mechanical transmission having an input shaft for connection to an engine and an output shaft for delivering rotation power to a multiple speed axle;

wherein said multiple speed axle is selectively shiftable between a first speed range and a second speed range;

a manually operated actuation device to initiate an axle shift of said multiple speed axle to selectively control said mechanical transmission by preventing said transmission from shifting gears during said axle shift between said first torque range and second high torque range;

speed sensors mounted on drive wheels connected to said multiple speed axle and said output shaft of said transmission; and a processing unit for receiving inputs indicative of operation of said actuation device and said speed sensors and for processing said inputs according to predetermined logic rules for issuing command output signals to a non-manually controlled operator and an axle shift solenoid, wherein said controlled operator automatically places said transmission in a hold mode in response to said outputs from said processing unit if said inputs are within a predetermined range, thereby preventing said transmission from shifting gears while said axle shift is being performed, actuation of said axle shift solenoid permitting automatic shifting of said multiple speed axle;

said processing unit canceling initiation of said axle shift if said inputs are outside of said predetermined range such that said transmission is maintained in a drive mode that permits automatic shifting of said transmission gears;

wherein once said transmission is placed in said hold mode, automatic shifting of said multiple speed axle further includes automatic interruption of torque to said multiple speed axle and synchronizing an axle-input speed to achieve axle engagement.

21. The system as recited in claim 20, further including an indicator actuated by said processing unit that informs the vehicle operator that said initiation of said axle shift has been canceled when said inputs are outside said predetermined range.

22. The system as recited in claim 20, whereby said processing unit evaluates said axle engagement and determines if said axle engagement has been achieved, wherein if said axle engagement has not been achieved, said processing unit automatically returns to said synchronizing said axle-input speed to achieve axle engagement, wherein said processing unit automatically returns said transmission to said drive mode when said axle engagement has been achieved.

* * * * *